Jan. 14, 1936.  F. W. TRABOLD  2,027,494
MIXING GAUGE
Filed Dec. 12, 1932
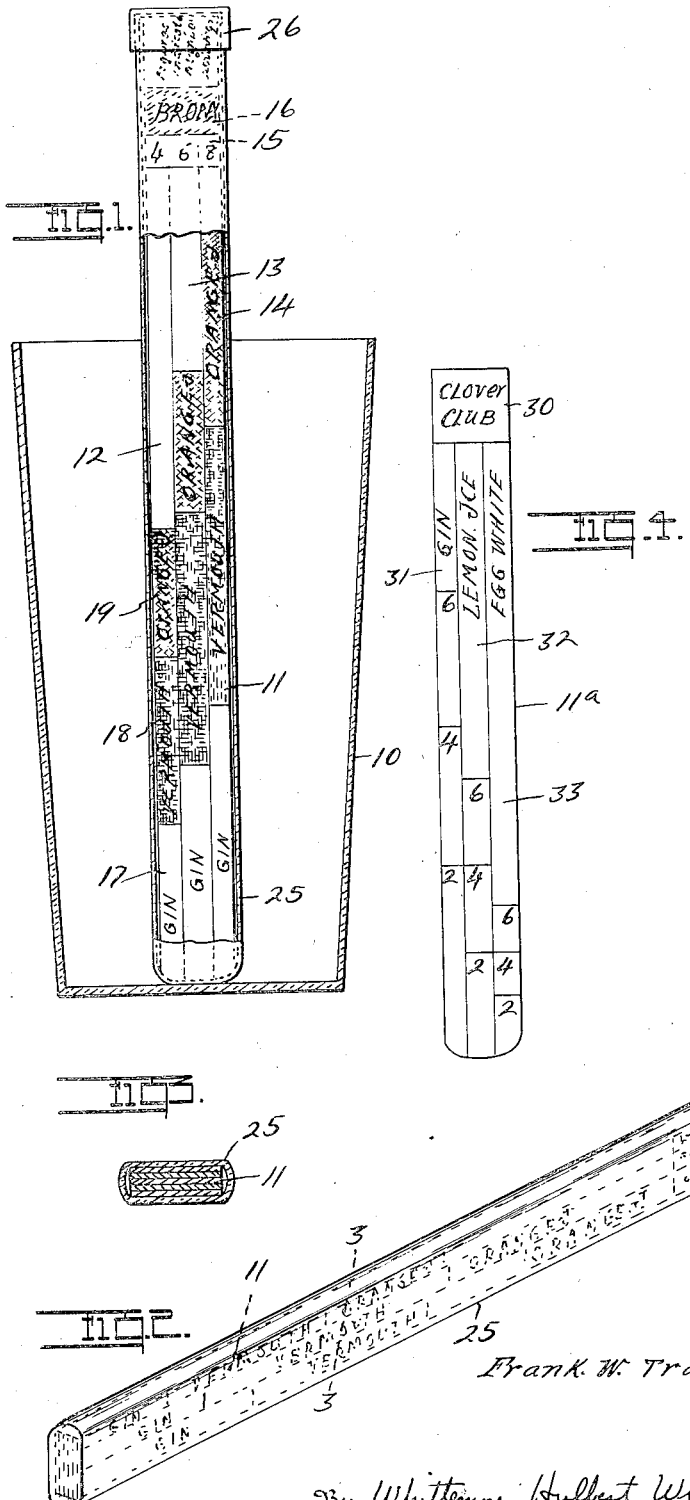
Inventor
Frank W. Trabold
By Whittemore Hulbert Whittemore
 & Belknap  Attorneys Patented Jan. 14, 1936

2,027,494

UNITED STATES PATENT OFFICE 2,027,494

MIXING GAUGE

Frank W. Trabold, Detroit, Mich.

Application December 12, 1932, Serial No. 646,884

1 Claim. (Cl. 73—120)

This invention relates to a meter or gauge adapted more particularly for use in mixing beverages and the like.

One of the primary objects of this invention is to provide a gauge by which beverages, flavoring sauces, and the like may be mixed with constant absolute uniformity and accuracy.

A further object of this invention is to provide a gauge of the above mentioned character which will be simple in construction and which will render easy the proper compounding of desired mixtures.

Numerous other objects and advantages of the invention will become more apparent as the following description proceeds, particularly when reference is had to the accompanying drawing, wherein:

Fig. 1 is a view partly in section and partly in elevation showing a gauge constructed in accordance with the teachings of this invention;

Fig. 2 is a perspective view of one of the elements shown in Fig. 1;

Fig. 3 is a sectional view taken substantially on the line 3—3 of Fig. 2;

Fig. 4 is a detail plan view of a slightly modified gauge strip;

Referring then particularly to the drawing wherein like reference characters designate corresponding parts throughout all views, the numeral 10 designates a receptacle in which the ingredients to be compounded may be measured and mixed. This receptacle is preferably, although not necessarily, formed of some transparent material, such, for example, as glass, and is of a predetermined size so as to properly cooperate with the gauge strip about to be described.

The numeral 11 designates an elongated gauge strip which may be of paper, celluloid, cardboard, metal, or any suitable material. Suitably placed on this strip are indicia indicating the level to which the several ingredients should be added to the receptacle 10 to produce a mixture of the character desired. By way of illustration, the strip is shown as having indicia indicating the quantities of the ingredients necessary to make a Bronx cocktail.

Referring then particularly to Fig. 1, it will be noted that the front face of the strip is divided into the longitudinally extending columns 12, 13 and 14. Disposed at the top of these columns is indicia designated generally by the reference character 15, this indicia indicating the number of portions which will result when the ingredients are mixed in the quantities indicated in the several columns. Disposed above the indicia 15 is indicia 16 which gives the name of the beverage or mixture being produced.

A Bronx cocktail comprises gin, vermouth, and orange juice. The columns 12 to 14, inclusive, are therefore divided into sections 17, 18, and 19, the sections 17 in each column indicating the level to which gin should be added to the receptacle 10, the section 18 in each column indicating the level to which vermouth should be added to the receptacle 10, and the section 19 in each column indicating the level to which orange juice should be added to the receptacle 10. It will be noted that the lengths of the sections 17, 18, and 19 vary in the several columns, thus properly varying the quantities of ingredients to be added to produce a mixture containing the desired number of portions to be served. It constitutes a feature of this invention that the section 16 of the strip is preferably colored to correspond to the color of the resulting mixture, while the sections 17, 18, and 19 are preferably colored to correspond to the colors of the several ingredients, the quantities of which they indicate.

Some cocktails require in addition to the main ingredients, small quantities of other flavorings. In such cases this fact will be indicated on the front face of the gauge strip, indicia being placed thereon advising of the necessity of using these flavorings. The rear or back face of the strip (not shown) is provided with suitable indicia, giving instructions as to the mixing and serving of the beverage, or the like, the quantities of the ingredients of which are indicated on the front face of the strip. The rear face of the strip also when necessary carries indicia indicating the nature and quantities of the flavorings to be added and the manner in which these flavorings should be mixed with the other ingredients to be compounded.

A number of the strips 11, each bearing indicia descriptive of a particular mixture, are assembled into a set or group and placed in a container 25. This container may, as illustrated, be in the form of an elongated flattened glass tube of a sufficient size to freely receive the desired number of strips 11. The container is preferably closed by a removable cap 26 whereby the several strips may be readily removed from the container.

In using the device, the strips 11 are first withdrawn from the tube 25, and that strip is selected which bears the indicia relating to the mixture which it is desired to compound. The selected strip is then placed in the container with the result that both faces of the strip bearing the quantities of the ingredients to be compounded and the directions for mixing the same will be visible through the container, as clearly illustrated in Figs. 1 and 2 of the drawing. The tube 25 is then placed in the receptacle 10 in the manner illustrated in Fig. 1, and the several ingredients are added to the receptacle, each ingredient being added to the level indicated. It will be apparent that when the several ingredients are successively added to the receptacle 10, each to the level indicated by its respective section on the strip 11, the receptacle 10 will contain a mixture which will correspond exactly to that desired.

It will be apparent that the tube 25 will provide a convenient storage receptacle for a number of the gauge strips 11. The removable cap for this tube provides that the strips may be removed and any selected strip returned to the tube for use during the compounding of the desired mixture. The gauge strip used will provide a definite formula for the mixture desired, which formula will be laid out mathematically correctly so that by following the graduations on the gauge strip, an accurate compounding of the mixture may be obtained. Further, each gauge strip will contain on its rear face suitable instructions for the proper blending and/or flavoring of the compound in accordance with accepted practice.

While it is convenient to provide a removable cover for the tube 25 and to store a number of the strips 11 in this tube, it will be apparent that if desired, the tube 25 may be made of such size as to receive only one strip and the tube be sealed with this strip in the same. Still further, the gauge strips 11 might themselves be made of some material which would resist the action of the compound being mixed, or the strips might be covered with some material baked or fired thereon which would render them capable of resisting the compound being mixed, with the result that the strips could be used without being enclosed in a glass tube or the like.

It will be understood that when the container 10 is transparent, the graduations on the gauge strip will be visible through the container. If, on the other hand, a non-transparent container is utilized, the graduations on the gauge strip may be observed by looking downwardly on the inside of the container through the open upper end thereof.

In Fig. 4 a slightly modified type of strip is disclosed and designated by the reference character 11ª. This strip has a portion 30 which receives indicia indicative of the name of the beverage or the like for which the strip is a gauge. The strip is divided longitudinally into the columns 31, 32 and 33, and at the top of the columns is indicia indicating the ingredients to go into the mixture. In the embodiment illustrated, the columns are headed "gin", "lemon juice" and "egg white", respectively. The columns are divided into sections 32, showing the quantity of each ingredient necessary to compound a predetermined number of portions of the beverage being mixed. Thus column 31 has three sections designated by the numerals 2, 4, and 6, thus indicating the level to which gin must be added to a suitable receptacle to make a mixture serving two, four and six portions, respectively. The columns 32 and 33 are similarly divided into sections showing the several quantities required of the several ingredients entering into the mixture.

In using this gauge, it is contemplated that the ingredients will not be successively added to the receptacle, but each ingredient will be emptied from the receptacle before the next ingredient is placed in the same. Thus, for example, gin would first be added to the receptacle to the level indicated for the desired number of portions, and then this measured quantity of gin would be placed in a second mixing container. The lemon juice would then be added to the receptacle to the level indicated, and then this lemon juice would be poured from the receptacle into the mixing container. It will be obvious that the same practice would be followed with the egg whites to be added to the mixture. The advantage of this modified form of gauge is that a smaller measuring receptacle may be utilized.

What I claim as my invention is:

In a device of the character described, a series of strips, each having indicia indicating the quantities of each of the several ingredients to be incorporated in a desired mixture, and an elongated transparent enclosure adapted to be inserted in a mixing receptacle, said enclosure having its lower end closed and its upper end open for permitting the insertion and removal of said strips whereby a selected strip may be placed at the end of the series to have its indicia visible through said transparent enclosure.

FRANK W. TRABOLD.